Raymond E. Pechacek
Eugene J. Clay
INVENTORS

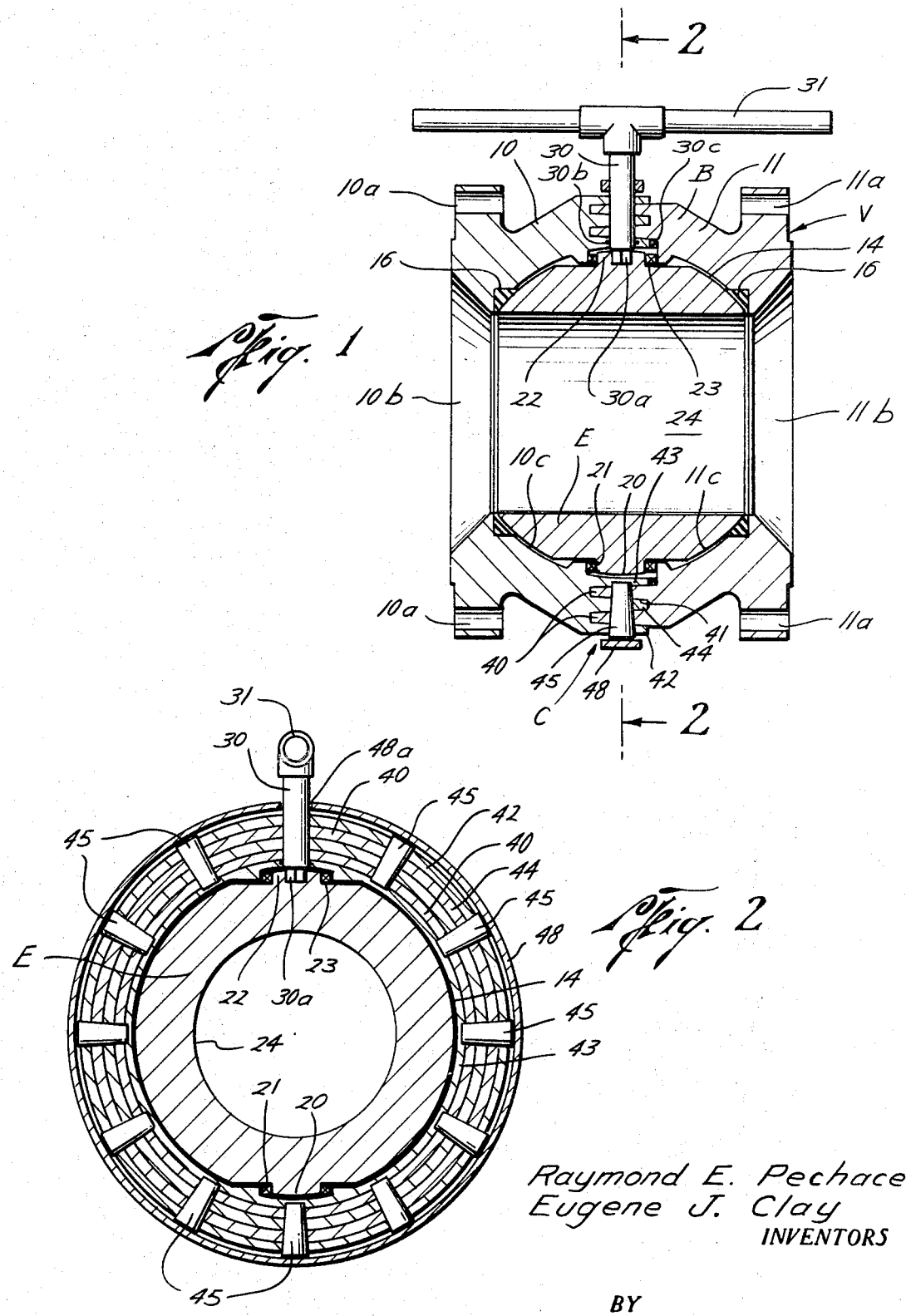

BY

Hayden Pravel Wilson & Matthews
ATTORNEYS

United States Patent Office 3,529,807
Patented Sept. 22, 1970

3,529,807
VALVES HAVING RELEASABLE COUPLINGS FOR PARTS SUBJECTED TO DIFFERENTIAL PRESSURE
Raymond E. Pechacek and Eugene J. Clay, Houston, Tex., assignors to Hahn & Clay, a corporation of Texas
Continuation-in-part of application Ser. No. 458,333, May 24, 1965. This application Dec. 28, 1967, Ser. No. 694,300
The portion of the term of the patent subsequent to Mar. 12, 1985, has been disclaimed
Int. Cl. F16k 27/00
U.S. Cl. 251—218          9 Claims

ABSTRACT OF THE DISCLOSURE

Valves having releasable couplings for parts subjected to differential pressure, and wherein each of the mating sections of the coupling has a plurality of annular concentric rings or layers forming fingers which interfit with annular concentric rings or layers forming fingers on the other coupling section to provide a wall thickness formed by said rings capable of withstanding the differential pressure, and which fingers are retained together by a plurality of pins extending thereinto; the interfitting fingers being either integral with or welded to the parts which they couple together for providing strength to withstand high pressures acting thereon.

CROSS-REFERENCE TO RELATED APPLICATION

This application is a continuation-in-part of patent application, Ser. No. 458,333 filed May 24, 1965 now Pat. No. 3,372,828.

BACKGROUND OF THE INVENTION

The field of this invention is valves and similar structures having parts subjected to differential fluid pressure, particularly high internal fluid pressures.

Previously, valves and other parts subjected to pressure have been releasably coupled together by bolts and nuts joining radial flanges. Such prior art couplings are bulky, and it is a very time-consuming task to remove all of the bolts from such flanges to separate the sections coupled together. Connectors such as shown in Roesch et al. Pat. No. 3,123,243 and Rohe Pat. No. 3,215,304 have been known for simply joining parts together where differential fluid pressure was not a problem. Neither of such patents, nor any known prior art, provides a structure wherein annular concentric rings or layers on adjacent coupling sections interfit to form a wall thickness which has at least as much strength for withstanding pressure differential as the wall thickness of the parts coupled together.

SUMMARY OF THE INVENTION

The present invention provides a releasable coupling in which annular layers or rings are concentrically disposed and interfitted with corresponding annular layers or rings which serve as hoop-stress carrying members to provide a wall thickness at the coupling capable of withstanding high internal or differential pressure acting thereon, preferably at substantially the same wall thickness as that of the parts coupled. The annular layers or rings are releasably retained by pins which may be readily removed for quickly separating the releasably coupled parts.

BRIEF DESCRIPTION OF THE DRAWING

FIG. 1 is a vertical cross-sectional view of one form of the valve of this invention, with the valve element illustrated in an open position;

FIG. 2 is a cross-sectional view taken on line 2–2 of FIG. 1 and illustrating further details of the valve construction of FIG. 1.

DESCRIPTION OF THE PREFERRED EMBODIMENTS

Figure 3:
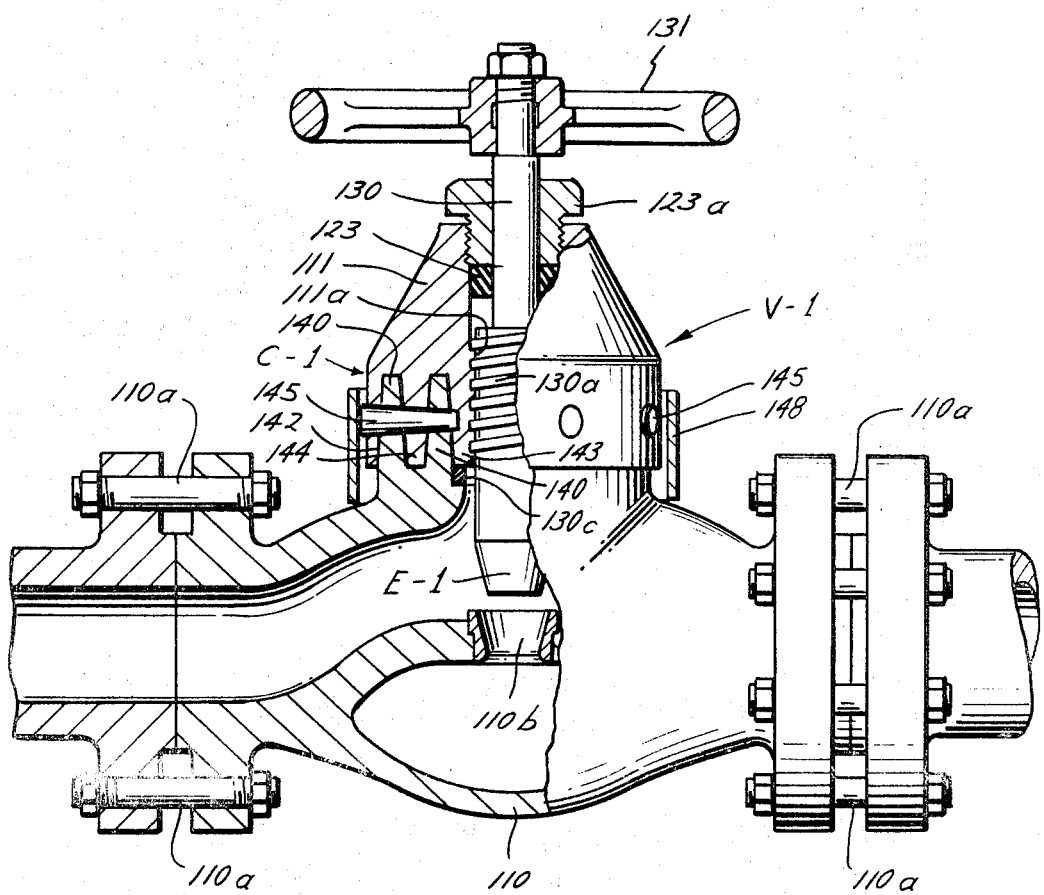
FIG. 3 is a view, partly in elevation and partly in section, illustrating another valve of the present invention which also employs a releasable coupling.

In the drawings, the letter V designates generally the valve illustrated in FIGS. 1 and 2. Such valve V has a releasable coupling C which, as will be explained in detail, makes it possible to readily separate the valve body B into two sections for exposing the valve element E and the other internal parts for replacement or repair purposes. The present invention eliminates the need for removing a large number of bolts and nuts connecting the body in the usual valve construction, and it also eliminates the need for tools in the separation of the sections of the body B, as will be more fully explained. With the present invention, the releasable coupling C is capable of holding relatively high pressures which normally are above about 1000 pounds per square inch and often are over 2000 pounds per square inch. The coupling C retains such pressure without requiring the thickness of the coupling C to be any greater than the thickness of the wall of the body B.

Considering the invention more in detail, and particularly the form of the invention illustrated in FIGS. 1 and 2, the valve body B includes a first vessel section 10 and a second vessel section 11 which are joined together by the releasable coupling C. The body section 10 has a plurality of longitudinally extending bolt holes 10a which extend circumferentially around the valve body core or central opening 10b so as to provide a means for connecting the valve body section 10 to a pipeline or other structure. Similarly, the valve section 11 has a plurality of bolt openings 11a which are circumferentially disposed with respect to the bore 11b for connection to a pipeline or other structure.

The valve element E which is disposed within the valve body section 10 and 11 has an external curved surface 14 which has a curvature substantially conforming to the internal surfaces 10c and 11c of the valve section 10 and 11, respectively. Suitable annular seals 16 formed of rubber, "Teflon," or any other suitable sealing material, are disposed between the external surface 14 of the valve element E and the internal surfaces 10c and 11c, preferably as illustrated in FIG. 1.

Additionally, the valve element E has a lower pivot portion or projection 20 which fits within a recess in the body sections 10 and 11 and is provided with an annular bearing 21. At the upper end of the valve element E, a similar hub or projection 22 is centrally disposed for disposition in a recess formed by the body sections 10 and 11 and in which an annual bearing 23 is disposed.

The valve element E has a longitudinal opening 24 therethrough which is illustrated in the drawings in the open position in alignment with the openings or bores 10b and 11b of the body sections 10 and 11. To rotate the valve element E from the open position to a closed position wherein the longitudinal opening 24 is disposed perpendicularly to the bores 10d and 11d so as to close flow through the valve V, a valve stem 30 is connected to the valve element E at the central upper hub 22. Such valve stem 30 may be manually slidable vertically with respect to the valve body B through a suitable opening in the releasable coupling C as illustrated in FIG. 1. The lower end of the valve stem 30 preferably has flat portions forming a nut or drive section 30a which fits into a corresponding recess within the hub 22 so as to impart movements of the stem 30 to the valve element E. Such valve stem 30 is in position during the use or operation of the valve V but may be readily removed when it is desired to disassemble the valve V as will be more evident hereinafter. The valve stem 30 preferably has a valve handle 31 of any suitable shape or configuration so as to facilitate rotation of the valve stem 30 and the valve element E as desired.

The coupling C includes a coupling section on each of the body sections 10 and 11, each of which includes a plurality of annular radially disposed fingers with an annular groove between adjacent fingers. The fingers on the body section 11 are designated with the numeral 40, and the groove therebetween is designated with the numeral 41. It is to be noted that the fingers 40 have a tapered cross-section with the outer ends of the fingers 40 being of the smaller dimension. It will be understood that the fingers 40 extend completely around to form a circle and likewise the annular space 41 therebetween is completely annular or circular.

The body section 10 has an outermost annular finger 42, an innermost annular finger 43, and an intermediate finger 44. Thus, in the preferred embodiment, the thickness of each of the fingers 40 on the section 11 and the finger 44 on the section 10 is the same, and all are tapered so that the finger 44 extends into the annular opening 41 to interfit in close engagement with the fingers 40. Between the outermost finger 42 and the central finger 44, an annular groove is formed for receiving the outermost finger 40, and between the central or intermediate finger 44 and the innermost finger 43, an annular recess is formed for receiving the innermost finger 40. The thickness of the outermost finger 42 and the innermost finger 43 is preferably the same, but they are normally only approximately one-half of the thickness of the fingers 40 and 44. It is also to be noted that each of the fingers 42, 44, and 43 is preferably formed with a tapered cross-section.

By forming the fingers 42 and 43 with a reduced thickness and by interfitting the intermediate finger 44 with the fingers 40 as illustrated in FIG. 1, the wall thickness at the releasable coupling C remains substantially equal to the wall thickness of the body sections 10 and 11 and at the same time the center line of the load on each half due to internal pressures within the valve V or a differential pressure acting on the coupling C is aligned to prevent a bending couple at the coupling C. Thus, a center line drawn through the center of the central finger 44 in FIG. 2 would locate the approximate center of the loading on each half of the releasable coupling C. Such construction can be extremely important, particularly when the pressures within the valve V are of the magnitude considered high pressure, which normally would be above about 1000 pounds per square inch.

It is to be noted that the fingers on each of the coupling sections interfit with each other and fill the grooves therebetween so as to form a continuous wall thickness with the interfitting fingers. This assures the distribution of the load and is particularly important at the high pressures contemplated with the present invention. A plurality of sets of circumferentially spaced radially aligned holes is provided in the fingers 40, 42, 43, and 44. The opening in the finger 44 is only a partial hole since it does not go all of the way through as can be seen in FIGS. 1 and 2 of the drawings. Preferably, such openings are tapered with the larger diameter at the outer diameter of the body sections 10 and 11. Retaining pins 45 of substantially the same size as the holes formed therein are provided for releasably retaining the coupling C in the assembled position. Such pins 45 may be manually inserted and manually removed so that tools are not required for the assembly and disassembly of the releasable connection C. Such pins 45 may be held frictionally within their respective openings, but preferably a retaining metallic ring 48 surrounds the pins 45 as illustrated in FIG. 2. It is to be noted that a suitable opening or space 48a is provided through which the stem 30 passes. Also, it is to be noted that each of the coupling fingers has a suitable opening therethrough through which the valve stem 30 extends.

In the operation or use of the releasable coupling C in the valve V of FIGS. 1 and 2, the valve body sections 10 and 11 are initially assembled with the fingers of the coupling C interfitting as illustrated in FIGS. 1 and 2. The pins 45 are then positioned in the openings through the fingers and thereafter the stem 30 is inserted for engaging the drive head 30a with the valve element E. It is to be noted that an O-ring 30b or any other suitable seal is provided for sealing around the valve stem 30 to prevent the loss of fluid around the stem 30 in the operating condition. The retaining band or ring 48 is then slipped into position, and it can be of a resilient metallic material so that it can be expanded over the end of the valve body and disposed in the position illustrated in FIGS. 1 and 2. The valve V is then ready for operation and may be used in the same manner as any other valve of this type.

If it is desired to open the valve V for replacement or repair purposes, the retaining band 48 is removed by springing same to open the ends at the stem 30 and sliding it off the valve body V, or it may simply be moved longitudinally a sufficient distance to expose the pins 45. Pins 45 may be removed manually or with any suitable equipment, but special equipment is not required. After the pins 45 are removed, the two halves of the body B, namely the body sections 10 and 11, may be quickly and rapidly separated so as to expose the entire inner portion of the valve V. In this way, the valve element E may be replaced or repaired, and any of the seals may be replaced or repaired. After the repair or replacement is accomplished the valve V can be readily reassembled by joining the fingers together as shown in FIGS. 1 and 2 and then inserting the pins 45 back into their retaining position shown in such drawings. The time involved for such procedure is substantially nil compared to the time required for removing a bolted type connection. Also, a bolted type connection would be substantially impossible to provide at the location of the coupling construction C so that the advantages of opening up the valve completely as with the present invention could not be obtained with such prior art structures.

A modified form of the present invention is shown in FIG. 3, wherein another type of valve V–1 is illustrated with the valve body 110 being a conventional valve body design except at the coupling C–1 and the parts associated therewith. The ends of the valve body 110 are connected to a pipeline or other suitable structure with connecting bolts 110a in the conventional manner. A valve bonnet 111 is disposed at the upper portion of the valve V–1, through which extends a valve stem 130 having a valve element E–1 thereon which is engageable with a valve seat 110a, which is removably mounted in the valve body 110. It will be understood that the valve stem 130 is rotated within the bonnet 111 so that a coaction of the threads 130a on the valve stem 130 with corresponding threads 110a on the valve bonnet 111 produces vertical movement of the valve element E–1 to seat same in a closed position on the valve seat 110a or open same by moving it upwardly with respect to such valve seat 110a. Suitable seals 123 are provided around the valve stem 130, and a suitable packing gland 123a is provided for retaining the seal 123 in the position.

The coupling C–1 is essentially of the same construction as that illustrated for the coupling C of FIGS. 1 and 2 in that the body portion 110 has a pair of annular coupling fingers 140 which are of the same thickness and preferably are tapered as illustrated with a groove therebetween for receiving an intermediate finger 144 formed on the bonnet 111. The outermost finger 142 and the innermost finger 143 on the bonnet 111 are preferably of a reduced thickness as compared to the fingers 140 and 144 so that the center line of the loading on the coupling C is at the center line of the finger 144 to prevent any bending moment or couple force at the coupling C–1 due to the relatively high pressures to which the coupling C–1 is exposed.

Although the thickness of the coupling C–1 is shown in FIG. 3 as being larger than the thickness of the wall of the body 110, this is not necessary since the coupling C–1 of the same thickness as the wall of the body 110 would have the same strength. The thickness of the coupling C–1 is larger than the wall thickness for ease of assembly, but with the coupling C–1 having the same thickness as the wall of the body 110, the coupling C–1 has the same strength as the wall of the body 110.

Circumferentially spaced radially disposed retaining pins 145 which correspond with the pins 45 in FIGS. 1 and 2 are provided for retaining the fingers of the coupling C–1 together in operation. The fingers 145 are preferably held by a retaining band 148 so as to assure that they do not move radially inadvertently in use.

A seal 130c which corresponds with the seal 30c is annularly disposed between the ends of the finger 143 and the body 110 as illustrated in the drawings for preventing fluid from leaking through the coupling C–1.

In the form of the invention illustrated in FIG. 3, the bonnet 111 may be readily removed by sliding the retaining band 148 upwardly and pulling the pins 145 out of the coupling C–1. Such pins 145 may be pulled out manually or with any tool as desired. After the pins 145 are removed, which can be accomplished very quickly, it will be evident that the bonnet 111 together with the valve stem 130, its handle 131, and the valve element E–1 and all parts therewith may be readily separated from the valve body 110. Thus, the valve element E–1 is readily removed for repair or replacement, and the valve seat 110a is likewise exposed for repair or replacement.

After any repair or replacement is accomplished, the valve bonnet 111 may be readily replaced with the fingers of the coupling interfitting as illustrated in FIG. 3, and then the pins 145 may be reinserted for holding the coupling C–1 in the assembled position. The retaining band 148 is then slipped downwardly over the pins 145 to prevent any inadvertent loosening of such pins 145 during use.

The foregoing disclosure and description of the invention are illustrative and explanatory thereof, and various changes in the size, shape, and materials as well as in the details of the illustrated construction may be made without departing from the spirit of the invention.

We claim:
1. A valve having a releasable coupling, comprising:
  (a) a first valve section having an annular end portion;
  (b) a second valve section having an annular end portion;
  (c) a first coupling section extending from said annular end portion of said first valve section and forming a part of said first valve section;
  (d) said first coupling section having a plurality of annular radially disposed fingers with an annular groove between adjacent fingers;
  (e) a second coupling section extending from said annular end portion of said second valve section and forming a part of said second valve section;
  (f) said second coupling section having a plurality of annular radially-disposed fingers with an annular groove between adjacent fingers;
  (g) said fingers on said first coupling section and on said second coupling section interfitting with each other and filling said grooves in said sections to form a continuous wall thickness with said interfitting fingers;
  (h) the interfitting portions of said fingers having a plurality of sets of circumferentially-spaced, radially-aligned holes; and
  (i) a retaining pin releasably positioned in each of said sets of holes for releasably retaining said fingers in their interfitting relationship.

2. The structure set forth in claim 1, wherein:
  (a) each of said fingers has a tapered cross-sectional area; and
  (b) each of said openings for receiving said fingers has a correspondingly tapered cross-sectional area.

3. The structure set forth in claim 1, wherein:
  (a) each of said radially-aligned holes is tapered from a larger outer diameter to a smaller inner diameter; and
  (b) each of said retaining pins is tapered to correspond with the tapered holes.

4. The structure set forth in claim 1, including:
  (a) a retaining ring surrounding said retaining pins for preventing withdrawal of said pins until said coupling is to be released.

5. The structure set forth in claim 1, wherein:
  (a) said first valve section and said second valve section each form one-half of the valve body; and
  (b) said coupling sections are at substantially the center of the valve body, whereby a release of said coupling sections fully separates the valve body to expose the internal parts thereof for replacement or repair.

6. The structure set forth in claim 1, wherein:
  (a) said first valve section is a valve body having an opening therein surrounded by said first coupling section;
  (b) said second valve section is a valve bonnet having said second coupling section therewith; and
  (c) said valve also has a valve stem operably mounted in said valve bonnet and also a valve seat in said valve body, whereby upon a release of said coupling sections from each other, said valve stem is removed with said valve bonnet and said valve seat is exposed for replacement or repair.

7. The structure set forth in claim 1, wherein:
  (a) the annular thickness of each of said fingers in said first section is substantially the same;
  (b) the annular thickness of the innermost and the outermost fingers in said second section is substantially equal to each other; and
  (c) the annular thickness of each finger between said innermost finger and said outermost finger is the same and is approximately equal to the total combined thickness of said innermost and outermost fingers.

8. The structure set forth in claim 1, wherein:
  (a) said holes are completely through each of said fingers except for the innermost finger.

9. The structure set forth in claim 1, including:
  (a) seal means at said coupling sections for preventing the escape of fluid from the valve body through said coupling sections.

References Cited
UNITED STATES PATENTS

| | | | |
|---|---|---|---|
| 2,792,196 | 5/1957 | Clade | 251—315 X |
| 3,009,680 | 11/1961 | Kaiser | 251—367 X |
| 3,006,602 | 10/1961 | Usab | 251—317 X |
| 3,148,897 | 9/1964 | Hurt et al. | 285—81 X |
| 3,357,594 | 12/1967 | Grosh et al. | 285—330 X |

WILLIAM F. O'DEA, Primary Examiner

D. R. MATTHEWS, Assistant Examiner

U.S. Cl. X.R.

137—315; 251—316